(12) United States Patent
Rovetto

(10) Patent No.: US 12,402,614 B2
(45) Date of Patent: Sep. 2, 2025

(54) FISHING JIGS THAT SECURELY HOLD NATURAL WORMS, AND RELATED METHODS

(71) Applicant: Legacy Tackle LLC, Plainfield, VT (US)

(72) Inventor: John Rovetto, Plainfield, VT (US)

(73) Assignee: Legacy Tackle LLC, Plainfield, VT (US)

( * ) Notice: Subject to any disclaimer, the term of this patent is extended or adjusted under 35 U.S.C. 154(b) by 0 days.

(21) Appl. No.: 18/632,650

(22) Filed: Apr. 11, 2024

(65) Prior Publication Data
US 2024/0341292 A1   Oct. 17, 2024

Related U.S. Application Data

(60) Provisional application No. 63/459,410, filed on Apr. 14, 2023.

(51) Int. Cl.
*A01K 83/06*   (2006.01)
(52) U.S. Cl.
CPC ................. *A01K 83/064* (2022.02)
(58) Field of Classification Search
CPC .............. A01K 83/06; A01K 83/064
See application file for complete search history.

(56) References Cited

U.S. PATENT DOCUMENTS

| | | | | |
|---|---|---|---|---|
| 805,284 A * | 11/1905 | Greenway et al. | .... | A01K 83/06 |
| | | | | 43/44.8 |
| 1,497,019 A * | 6/1924 | Hennings | ............... | A01K 85/16 |
| | | | | 43/42.49 |
| 4,123,870 A * | 11/1978 | Wiskirchen | ............ | A01K 83/00 |
| | | | | 43/42.39 |
| 4,712,326 A * | 12/1987 | Hoover | .................. | A01K 85/01 |
| | | | | 43/42.31 |
| 4,713,907 A * | 12/1987 | Dudeck | .................. | A01K 85/00 |
| | | | | 43/42.39 |
| 5,081,786 A * | 1/1992 | Cobb | ...................... | A01K 85/00 |
| | | | | 43/44.89 |
| 5,245,783 A * | 9/1993 | Cumiskey | ............... | A01K 85/00 |
| | | | | 43/42.37 |
| D463,841 S * | 10/2002 | Gentry | ......................... | D22/126 |
| 6,898,894 B1 * | 5/2005 | Anderson | .............. | A01K 85/00 |
| | | | | 43/42.39 |
| 7,614,178 B2 * | 11/2009 | Hoyt | ...................... | A01K 85/01 |
| | | | | 43/44.8 |
| 8,186,096 B2 * | 5/2012 | Rubin | .................... | A01K 91/04 |
| | | | | 43/42.49 |
| 2017/0339936 A1 * | 11/2017 | Simmons | ............... | A01K 91/04 |

* cited by examiner

*Primary Examiner* — Richard G Davis
(74) *Attorney, Agent, or Firm* — Downs Rachlin Martin PLLC

(57) ABSTRACT

Fishing jigs designed and configured to firmly hold natural worms during use. In some embodiments, a fishing jig includes a head, a shaft that tapers away from the head, and an impaler that pierces the entire thickness of the body wall of a worm. The cross-sectional size of the shaft proximate to the impaler is selected so that the body wall of the worm is taut when the worm is fully engaged with the fishing jig. In some embodiments, the impaler is angled toward the head of the fishing jig at an angle of 45° or less. In some embodiments, the fishing jig further includes a bumper on its bottom to assist with inhibiting a worm engaged with the fishing jig from catching on underwater objects.

16 Claims, 2 Drawing Sheets

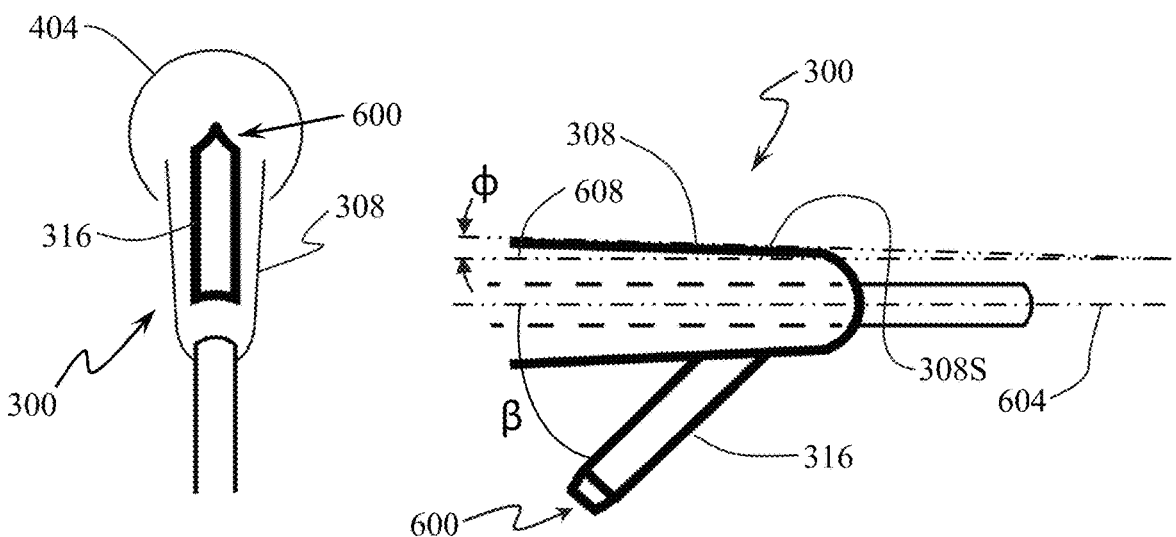
FIG. 6A
FIG. 6B
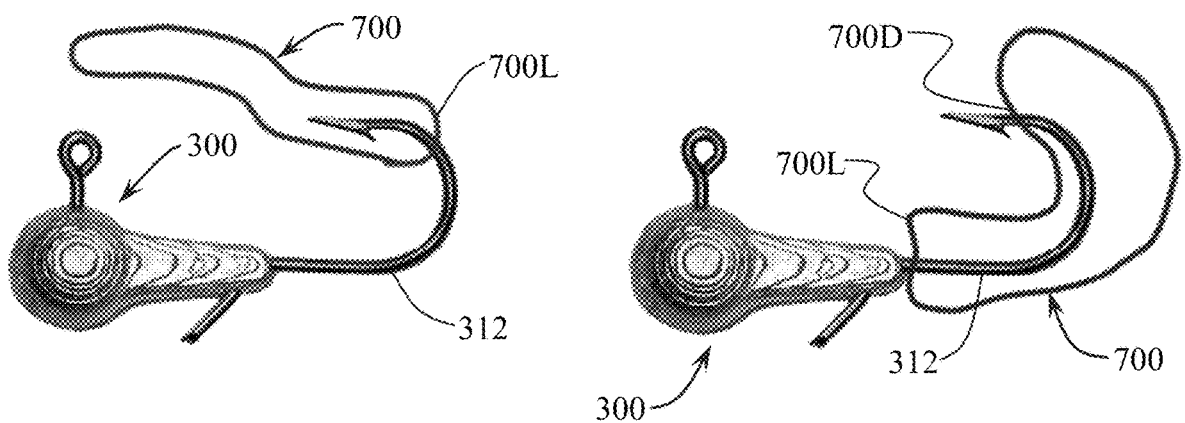
FIG. 7A
FIG. 7B
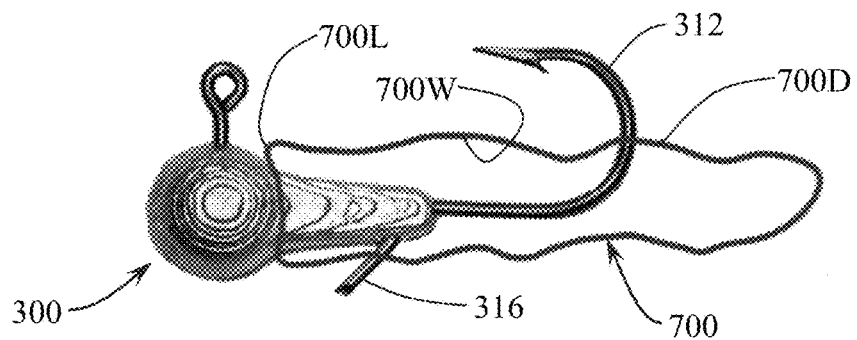
FIG. 7C

FISHING JIGS THAT SECURELY HOLD NATURAL WORMS, AND RELATED METHODS

RELATED APPLICATION DATA

This application is a nonprovisional of U.S. Provisional Patent Application Ser. No. 63/459,410, filed on Apr. 14, 2023, and titled "FISHING JIGS THAT SECURELY HOLD NATURAL WORMS, AND RELATED METHODS", which is incorporated by reference herein in its entirety.

FIELD

The present disclosure generally relates to fishing jigs. In particular, the present disclosure is directed to fishing jigs that securely hold natural worms, and related methods.

BACKGROUND

Presentation in fishing can mean the difference between just fishing and catching fish. Fishing with live bait is time-honored and one of the most sure ways to catch fish. This has been proven throughout the millennia and beyond. Fishing with a worm or night crawler is still one of the most effective, granddad-tested, ways to catch fresh water fish the world over.

The presentation of bait to fish desired to be caught is extremely important to anglers. Problems continually encountered while fishing for perch, a common panfish, is the fact that many conventional jigs do not hold night worms (e.g., night crawlers) in the manner desired for presenting it to the fish, which is parallel to the ground/bottom of the relevant body of water. The worm would always slip off to about mid-way down the shank of the hook, ruining the presentation.

SUMMARY

In one implementation, the present disclosure is directed to a fishing jig for use with a natural worm having a body wall. The fishing jig includes a body that includes a head and a shaft secured to the head, wherein the shaft has: a distal end opposite the head of the body; and a tapering shape that tapers toward the distal end and is designed and configured to receive the natural worm and progressively stretch the body wall of the natural worm in a circumferential direction as the natural worm is advanced onto the shaft; a line-attachment structure secured to the body and designed and configured to receive a fishing line; a fishing hook engaged with the shaft and projecting from the distal end of the shaft and extending in a direction away from the head; and an impaler secured to the shaft at a location spaced from the distal end of the shaft, wherein the impaler has: a piercing tip angled away from the distal end of the shaft; and a length from the shaft to the piercing tip selected so that, when the natural worm is fully engaged with the jig, the impaler extends through the body wall of the natural worm so that the piercing tip is exposed to view.

In another implementation, the present disclosure is directed to a method of designing a fishing jig. The method includers selecting a natural worm for use with the fishing jig, wherein the natural worm has a body wall having a thickness; determining a size of a cross-sectional shape needed to stretch the body wall; designing a body for the fishing jig, wherein designing the body includes: designing a head of the fishing jig; and designing a shaft that is attached to the head so that: the shaft has a cross-sectional size in a region proximate to the head that is at least the size of the cross-sectional shape needed to stretch the body wall of the natural worm; and the shaft tapers in a direction away from the head; and designing an impaler for piercing the body wall of the natural worm when the natural worm is engaged with the fishing jig, wherein the impaler is angled at an impaler angle toward the head and has a length extending from the shaft that is greater than the thickness of the body wall of the natural worm; and locating the impaler proximate to the region of the shaft proximate to the head.

BRIEF DESCRIPTION OF THE DRAWINGS

For the purpose of illustration, the accompanying drawings show aspects of one or more embodiments of the disclosure. However, it should be understood that the scope of this disclosure is/are not limited to the precise arrangements and instrumentalities shown in the drawings, wherein:

FIG. 6A is an enlarged partial perspective view of the fishing jig of FIG. 3, showing the impaler as having a chiseled tip;

FIG. 6B is an enlarged partial side view of the fishing jig of FIG. 3, showing details of the impaler and portions of the body of the jig; and FIGS. 7A-7C show a sequence of stages of threading a natural worm onto the fishing jig of FIG. 3.

DETAILED DESCRIPTION

Working Toward a Solution

As noted in the Background section above, many conventional jigs lack a design that provides a proper bait holder for live worms that would effectively keep a live worm pinned in place on the hook. A common way to hook a worm to a hook is to "thread" it onto the jig, which means to pierce a section of the worm and push the worm around the hook and up the shank until it stops at the ball head of the jig. It is here that current jigs on the market for live worms fail.

Figure 1:
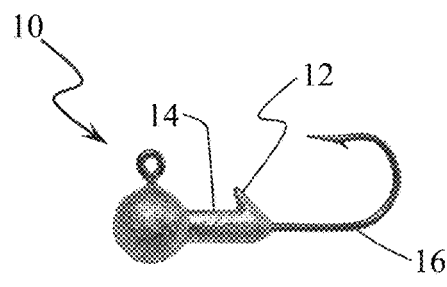
FIG. 1 is a side view of a conventional fishing jig.

FIG. 1 shows a conventional jig 10 that has a bait holding protrusion 12 at the end of a lead weight shaft 14. Despite this jig 10 having the prominent bait-holding protrusion 12, its overall design will not keep a natural worm (not shown) securely on the hook 16. The reason why is that this style of conventional jig 10 was designed to hold soft plastic baits, and does so really effectively. However, for live worms it always disappoints when the worm slips off that bait-holding protrusion 12.

Figure 2:
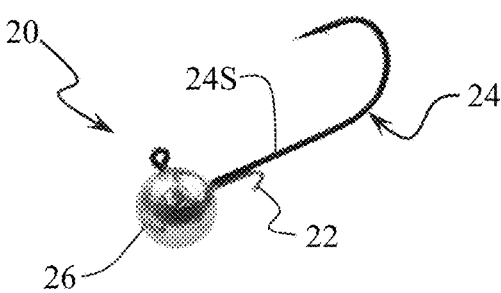
FIG. 2 is a perspective view of another conventional fishing jig.

FIG. 2 shows another commonly encountered conventional jig 20 that has a simple wire bait holder 22 immediately adjacent to the shank 24S of the hook 24 that projects from the jig head 26. Natural worms will catch on this bait holder 22. However, the problem with the design of this jig 20 is that the natural worm rips easily where it catches on the bait holder 22. This ripping results from all the water (not shown) the worm (not shown) catches in the opening made to thread the worm onto the hook 24 as the fisherman reels the jig 20 through the water. The ripping of the worm causes it to slip off of the hook 24 and lose presentation.

A Solution

The present inventor has discovered that what is important for the functionality needed to hold a natural worm (or simply "worm" hereinafter, as distinguished from any artificial worm) onto a jig to provide for proper worm presentation to fish is the ability to fully pierce through the body wall of the worm and simultaneously keep the body wall of the worm stretched after it has been fully pierced. The result of this discovery is a weighted jig that has both a shaft that stretches the body wall of the worm to keep it taut around the circumference of the shaft and an impaler that effectively pierces the body wall of the worm all the way through the body wall to firmly hold the stretched body wall from slipping off of the shaft. These two features, acting in concert with one another, prevent the worm from slipping off and diminishing the presentation to the fish, even under relatively severe conditions of reeling-in the jig and being contacted by objects in the water, such as submerged branches and rocks. It is a true natural-worm jig.

Generally, the impaler needs to strike a balance between angle and length, which needs to be considered relative to the circumference of the jig shaft and the typical size of the natural worm anticipated to be used with the jig. The body wall of a natural worm has a certain elasticity that allows the worm to be drawn or pushed over the impaler without tearing the body wall and then allows the body wall to contract slightly while still remaining relatively taut once impaled by the impaler so as to maintain a tight fit with the jig shaft.

During testing with an experimental natural-worm jig having the new features, the catch rate went up, enhancing the fishing experience greatly. Indeed, the natural-worm jig seemed to greatly improve fishing panfish and perch specifically in the testing. For further confirmation, it was amazing how well the natural-worm jig worked and how the jig would mouth hook a fish.

With a naked hook—an old school, tried and true, go-to way to fish perch—many times fish become gut hooked due to the fact fish can swallow the naked jig whole. With a jig head, the feeling of the bite is much greater. And with a slight lift of the fishing rod, the fish gets hooked in the mouth nearly every time, greatly reducing the foul hooking of fish.

Figure 3:
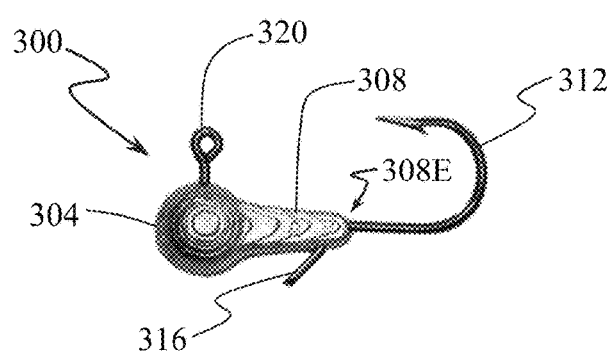
FIG. 3 is a side view of an example fishing jig made in accordance with aspects of the present disclosure.

The positive results of the experimental natural-worm jig noted above motivated further improvements and refinements, resulting in the example jig 300 of FIG. 3. To make the jig 300, the present inventor printed a mold. When the print was finished, high-temperature silicone was used to make the relief into which bismuth was poured. It is noted that materials other than bismuth can be used, such as tungsten and lead, among others, and alloys thereof.

As seen in FIG. 3, the jig 300 includes a ball-shaped head 304, a shaft 308 extending from the head, a hook 312 anchored in the shaft and extending away from the head, and an impaler 316 projecting out of the shaft in a direction generally away from the hook. The impaler 316 is spaced from the free end 308E of the shaft 308, and the shaft tapers from a larger circumference close to the head 304 to a smaller circumference at its free end. The tapering of the shaft 308 and the angling of the impaler 316 allows a user, after threading a natural worm (not shown) onto the hook 312, to easily slide a natural worm onto the shaft 308 past the impaler and then pierce the impaler through the body wall of the worm while the body wall is still in a stretched condition. As noted above, the combination of the body wall being in a taut state by the shaft 308 and fully pierced by the impaler 316 firmly holds a natural worm on the jig. In this example, the jig 300 also includes a line-attachment structure 320 for attaching the jig to a fishing line (not shown).

Figure 4:
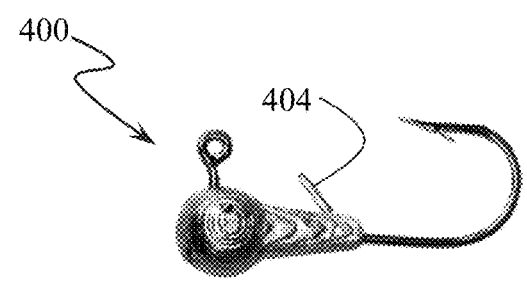
FIG. 4 is a side view of another example fishing jig made in accordance with the present disclosure having an impaler on the side opposite of the impaler side shown in FIG. 3.

FIG. 4 shows another example jig 400 that is generally identical to the jig 300 of FIG. 3, except that the impaler 404 is located on the opposite side of the jig relative to jig 300. Other aspects and features of the jig 400 of FIG. 4 may be the same as or similar to the like aspects and features of the jig 300 of FIG. 3. In other embodiments, two or more impalers may be provided on the same or opposite side relative to one another. In other embodiments, a single impaler may be located elsewhere, such as on the side of the jig 400 facing the viewer of FIG. 4 or on the side facing away from the viewer. Those skilled in the art will understand that a variety of modifications can be made while staying within the scope of the present disclosure.

Figure 5:
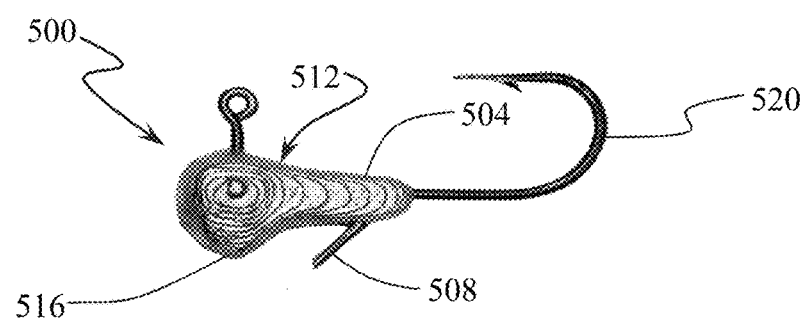
FIG. 5 is a side view of yet another example fishing jig made in accordance with the present disclosure, showing the fishing jig as having an integrated bumper for protecting a worm (not shown) engaged with the fishing jig from catching on to objects during use.

FIG. 5 illustrates a jig 500 made in accordance with the present disclosure that includes additional features that may appeal to some anglers' needs. This embodiment is slightly heavier and slightly bigger in size than the embodiment shown in FIGS. 3 and 4, which allows it to drop faster in the water. The jig 500 of FIG. 5 also has a shaft 504 that is large in circumference to fill out a larger natural worm (not shown) and stretches the body wall of the worm once the worm is on the impaler 508. It is noted that the jig body 512 can be coated as desired, for example, with an enamel, such as a phosphorescent enamel, among many other materials.

The jig 500 of FIG. 5 also features a kind of "bumper" or "bait guard" or "anti-snag feature" (referred to here as bumper 516) on the bottom and front side of the jig body 512. The asymmetric design of the jig 500 relative to this bumper 516 helps an angler avoid getting snagged on an underwater structure. In essence it works as a shield by allowing the jig 500 to literally bump over and pass any structure, especially a structure that is hard in character.

Fish like to congregate around underwater structures such as downed trees and/or rocks. Oftentimes anglers know and fish these "hot spots" in search of a fish bite, and a natural worm or other bait can take a beating with all the casting, hitting the water, getting dragged through weeds, scraping on rocks, bumped on trees, and perhaps getting chewed on by a fish that did not have the hook 520 quite in the mouth, in other words, the proverbial "one that got away!" The bumper 516 also serves to protect the bait (not shown) on the hook 520 and the impaler 508 itself. In contrast, in a top-side impaler location (see FIG. 4), the eye of the hook is what protects the bait and impaler for the most part.

General Information

The Hook

In some embodiments, such as, for example, in the jigs 300, 400, and 500 of, respectively, FIGS. 3, 4, and 5, jigs of the present disclosure may be designed around any suitable hooks, for example, two differently sized Aberdeen, 90° jig hooks (or "J-hooks), such as the Eagle Claw 575-4 Size #4 and the Mustad 32755BR Size #6. The same jig design fits nicely over each of these two hooks in the molding process. The present inventor has found that these two sizes of jig hook are optimal for the size of the target fishes' mouths, here, perch mouths. That said, those skilled in the art will readily understand that the general jig-design principles disclosed in this application can be adapted to different types and/or sizes of fish, as well as other hook styles and/or sizes, among other variables.

The Weight

In some embodiments, such as, for example, in the jigs 300, 400, and 500 of, respectively, FIGS. 3, 4, and 5, the body (head plus shaft), or the "weight", may be a bismuth ball-head style with a tapered shaft or extension that runs down the shank of the hook. In some example embodiments, the length of the shaft/extension is about 13 mm, though other lengths may readily be used. The ball head is a jig design standard to add weight in the front of the jig, which helps to keep the jig parallel to the ground beneath the water. This jig is designed to fish parallel to the ground for maximum attractiveness.

The Impaler

In some embodiments, including in the jigs 300, 400, and 500 of, respectively, FIGS. 3, 4, and 5, the impaler is made of quality 0.60 mm spring steel wire, which provides a strong and sharp pin to pierce the body wall (e.g., muscle and skin) of a natural worm. Other impalers and/or materials may be used. It is noted that other jig designs made in accordance with the present disclosure also apply very well to soft plastic baits of almost every kind, making this an extremely versatile and quite unique jig design. Each impaler can be molded into the shaft or secured to the shaft after the shaft has been formed, such as by inserting a portion of the impaler into a receiver formed in the shaft. In the latter example the impaler can be secured to the shaft in any suitable manner, such as friction fit, adhesive bonding, brazing, welding, etc., and any logical combination thereof.

As noted above, a desired feature of the impaler is that it is long enough to pierce entirely through the body wall of the natural worms that an angler desires to be used with the jig. Referring to FIGS. 6A and 6B, which show parts of the jig 300 of FIG. 3, providing the impaler 316 with a length that is intentionally longer than needed to fully pierce a worm (not shown) can give the angler a potential option to customize the length of the impaler, for example by cutting it with wire snippers that create a double-chiseled tip 600 as shown in FIGS. 6A and 6B. This snipping creates a sharp, needle-like, dual-chiseled tip 600 on the end of the impaler 316 that allows the impaler to easily pass through the body wall of any natural worm that may be used on the jig 300. For example, for natural worm applications, the angler can trim the length of the impaler 316 just enough to hold the worm on the jig to keep the presentation as natural as possible, for example, leaving the length of the impaler in a range of about 1.5 mm to about 2 mm, minimum. For artificial soft plastic bait, the angler may need the impaler to be longer for effective holding ability.

Impaler Angle

In some embodiments and referring to FIG. 6B, a useful angle, $\beta$, of the impaler 316 relative to the central axis 604 of the shaft 308 and in a direction toward the head 304 of the jig 300 to hold a natural worm (not shown) is about 45° and allows for at least two functions. A first function is that it positively prevents the worm from slipping off the impaler 316, while allowing more ease when applying a natural worm or a soft plastics artificial worm. In some embodiments, the angle $\beta$ may be in a range of 30° to 45°, inclusive. Values of the angle $\beta$ higher than 45° can potentially present the possibility of the worm slipping off due to water, weeds, rocks, branches, etc., while an angler is reeling the line back in. It also becomes much harder to actually get the bait onto the jig 300, because lower values of the angle $\beta$ make it easier to slide the worm over the impaler 316. A second function is that it allows for enough space from the tip 600 of the impaler 316 to the shaft 308 to accommodate most natural worms and soft plastic bait, while keeping the overall low profile for maximum natural presentation.

Impaler Location(s)

As noted above, the impaler can be located, for example, either on the bottom side of the jig or on the top side of the jig along the shaft. Both are effective and both have their pros and cons. Each of these are discussed below. However, other locations are possible, such as on one or the other lateral sides of the jig. In addition, more than one impaler can be used, if desired.

Bottom-Side Impaler

A bottom-side location of the impaler is typically not in most jig head designs. By moving the bait holder to the bottom, an unimpeded way for fish to get hooked is provided, with nothing to impede the full closure of a fish's mouth and nothing to spook the fish by feeling the impaler on the topside of the jig shaft, thereby increasing the chance of a hook set. This idea very much appeals to anglers. However the bottom-side location has a slight increase in chance of the impaler getting snagged on an underwater structure or hung up on weeds. As noted above, FIG. 3 shows an example of a jig 300 made in accordance with the present disclosure and that includes a bottom-side impaler 316.

Top-Side Impaler

A top-side location of the impaler is more common with conventional jig designs and works well with a true natural-worm jig made in accordance with the present disclosure. A top-side location makes for a very clean presentation by not having the impaler on the bottom side and making the bait look as natural as possible. As noted above, sometimes the impaler on the top side may alert a fish that something is different and therefore not close its mouth, thereby reducing the overall chance of hooking the fish. If an angler likes to fish with soft plastic baits and desires a more authentic, natural presentation, having the impaler on the top side would be preferable and should be just as effective with a well-trimmed impaler. As noted above, FIG. 4 shows an example of a jig 400 made in accordance with the present disclosure that include a top-side impaler 404.

The Shaft

A purpose of the tapered shaft of jigs 300, 400, and 500 of FIGS. 3, 4, and 5, respectively, that extends from the head is to help fill out a natural worm to stretch the body wall once threaded onto the jig and pinned. The extension helps to maximize presentation by keeping the worm up on the shaft of the jig body and filling out and stretching the worm.

In some embodiments, including in the jigs 300, 400, and 500 of, respectively, FIGS. 3, 4, and 5, the optimal diameter of the shaft found to work with various types of natural worms is from about 3.5 mm at the ball head, down to about 2.2 mm at the distal end of the shaft. In some embodiments, including in the jigs 300, 400, and 500 of, respectively, FIGS. 3, 4, and 5, the conical collar terminates at about 1.5 mm past the impaler. In some embodiments, including in the jigs 300, 400, and 500 of, respectively, FIGS. 3, 4, and 5, the distance from the ball head to the bait-holder is about 7 mm and provides ample space to effectively "set" the bait on the bait-holder so that it "chokes up" around the ball head. As those skilled in the art will readily appreciate, all of the foregoing dimensions are exemplary and can be changed to suit particular natural worms of other sizes.

The conical shape of the shaft with a rounded end at the end of the shaft is crucial when sliding the worm on to the jig body (shaft) just before the impaler of the jig. The conical shape at the large end of the shaft before the jig head very effectively fills out the inside of the piece of worm that terminates naturally into contact with the ball of the jig once pinned to the impaler. This is the first part that engages the natural worm, and typically a piece of natural worm, as well as giving the impaler structural stability inside the metal of the shaft. As illustrated in FIG. 6B, in some embodiments the shaft 308 may have a taper angle, φ, formed between a line 608 parallel to the central axis 604 of the shaft and the surface 308S of the shaft. In some embodiments, the taper angle φ may be in a range of 1° to 15°, inclusive, or in a range of 5° to 10°, inclusive. However, other values of the taper angle φ may be used. In addition, the surface 308S of the shaft 308 need not be linear. For example, it could be curvilinear so as to form either a convex of a concave profile along the shaft 308.

"Threading The Worm"

As noted above, a purpose of the tapered shaft in jigs made in accordance with the present disclosure, including the jigs 300, 400, and 500 of FIGS. 3, 4, and 5, respectively, that extends from the ball head is to help fill out the natural worm to keep the body wall of the worm taut after a user has threaded the worm onto the jig and pierced the body wall with the impaler. The ideal presentation method is to fish this jig horizontally. As noted above, the tapered metal shaft terminates past the wire bait holder which helps to facilitate sliding the worm up and over the wire bait holder. FIGS. 7A through 7C show an example process of threading a natural worm 700 onto the jig 300 of FIG. 3. FIG. 7A shows the worm 700 after initial piercing by the hook 312. FIG. 7B shows the worm 700 fully threaded onto the hook 312 with the leading end 700L of the worm proximate to the body 304 of the jig 300 and a distal portion 700D of the worm pierced by the hook. FIG. 7C shows the worm 700 fully engaged with the jig 300, with the leading end 700L of the worm fully engaged with the shaft 308 of the jig and the impaler 316 fully piercing the body wall 700W of the worm. Those skilled in the art will readily appreciate that the worm 700 is generally shown as being transparent for clarity, with the understanding that natural worms are typically opaque.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Example embodiments have been disclosed above and illustrated in the accompanying drawings. It will be understood by those skilled in the art that various changes, omissions and additions may be made to that which is specifically disclosed herein without departing from the spirit and scope of the present invention.

The appended claims are to be considered to be part of this Detailed Description section as if presented fully in this section.

What is claimed is:

1. A fishing jig for use with a natural worm having a body wall, the fishing jig comprising:
   a body that includes a head and a shaft secured to the head, wherein the shaft has:
   a distal end opposite the head of the body; and
   a tapering shape that tapers toward the distal end and is designed and configured to receive the natural worm and progressively stretch the body wall of the natural worm in a circumferential direction as the natural worm is advanced onto the shaft;
   a line-attachment structure secured to the body and designed and configured to receive a fishing line;
   a fishing hook engaged with the shaft and projecting from the distal end of the shaft and extending in a direction away from the head; and
   an impaler secured to the shaft at a location spaced from the distal end of the shaft, wherein the impaler has:
   a piercing tip angled away from the distal end of the shaft; and
   a length from the shaft to the piercing tip selected so that, when the natural worm is fully engaged with the jig, the impaler extends through the body wall of the natural worm so that the piercing tip is exposed to view;
   wherein:
   the taper of the tapering shape extends along the shaft between the body and the impaler;
   the impaler is located on a side of the body opposite the line-attachment structure;
   the shaft has a central shaft axis;
   the line-attachment structure is located on a first side of the central shaft axis;
   the impaler is located on a second side of the central shaft axis, the second side being on the opposite side of the central shaft axis relative to the first side of the central shaft axis; and
   the head further includes an anti-snag feature on the head, the anti-snag feature located on the second side of the central shaft axis opposite the line-attachment structure, wherein anti-snag feature is formed by asymmetry of the head and is designed and configured to inhibit the impaler from snagging on an underwater structure during use of the fishing jig.

2. The fishing jig of claim 1, wherein the tapering shape of the shaft is frustoconical.

3. The fishing jig of claim 1, wherein the tapering shape of the shaft is pyramidal.

4. The fishing jig of claim 1, wherein the shaft has a taper angle in a range of 1° to 15°, inclusive.

5. The fishing jig of claim 4, wherein the taper angle is in a range of 5° to 10°, inclusive.

6. The fishing jig of claim 1, wherein the impaler is straight, angled toward the head, and forms an impaler angle with the central shaft axis of 45° or less.

7. The fishing jig of claim 6, wherein the impaler angle is in a range of 30° to 45°, inclusive.

8. The fishing jig of claim 1, wherein the piercing tip is a chiseled tip.

9. A method of designing a fishing jig, the method comprising:
   selecting a natural worm for use with the fishing jig, wherein the natural worm has a body wall having a thickness;
   determining a size of a cross-sectional shape needed to stretch the body wall;

designing a body for the fishing jig, wherein designing the body includes:
  designing a head of the fishing jig; and
  designing, as a function of the selected natural worm, a shaft that is attached to the head so that:
    the shaft has a cross-sectional size that increases in a region proximate to the head so that, as a worm is advanced onto the shaft during use of the fishing jig, the shaft increasingly stretches the body wall of the natural worm; and
    the shaft tapers in a direction away from the head; and
designing an impaler for piercing the body wall of the natural worm when the natural worm is engaged with the fishing jig, wherein the impaler is angled at an impaler angle toward the head and has a length extending from the shaft that is greater than the thickness of the body wall of the natural worm; and
locating the impaler in the region of the shaft that has the cross-sectional size that increases;
wherein:
  the impaler is located on a side of the body opposite the line-attachment structure;
  the shaft has a central shaft axis;
  the line-attachment structure is located on a first side of the central shaft axis;
  the impaler is located on a second side of the central shaft axis, the second side being on the opposite side of the central shaft axis relative to the first side of the central shaft axis; and
  the head further includes an anti-snag feature on the head, the anti-snag feature located on the second side of the central shaft axis opposite the line-attachment structure, wherein anti-snag feature is formed by asymmetry of the head and is designed and configured to inhibit the impaler from snagging on an underwater structure during use of the fishing jig.

10. The method of claim 9, wherein the shaft has a frustoconical shape.

11. The method of claim 9, wherein the shaft has a pyramidal shape.

12. The method of claim 9, wherein the shaft has a taper angle in a range of 1° to 15°, inclusive.

13. The method of claim 12, wherein the taper angle is in a range of 5° to 10°, inclusive.

14. The method of claim 9, wherein the impaler is straight, angled toward the head, and forms an impaler angle with the central shaft axis of 45° or less.

15. The method of claim 14, wherein the impaler angle is in a range of 30° to 45°, inclusive.

16. The method of claim 9, wherein the piercing tip is a chiseled tip.

* * * * *